United States Patent
Papasakellariou

(10) Patent No.: US 7,469,003 B2
(45) Date of Patent: Dec. 23, 2008

(54) METHOD AND APPARATUS FOR ADAPTIVE CHANNEL EQUALIZATION USING DECISION FEEDBACK

(75) Inventor: Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 671 days.

(21) Appl. No.: 10/302,257

(22) Filed: Nov. 22, 2002

(65) Prior Publication Data
US 2003/0227960 A1    Dec. 11, 2003

Related U.S. Application Data

(60) Provisional application No. 60/387,667, filed on Jun. 11, 2002.

(51) Int. Cl.
*H04B 1/00* (2006.01)
(52) U.S. Cl. .................. 375/147; 375/130; 375/136; 375/229; 375/232; 375/316; 375/348; 375/350; 381/103
(58) Field of Classification Search ............... 375/147, 375/316, 229, 130, 136, 232, 348, 350; 381/103
See application file for complete search history.

(56) References Cited

U.S. PATENT DOCUMENTS

| | | | |
|---|---|---|---|
| 5,675,344 A * | 10/1997 | Tong et al. | 342/457 |
| 6,175,588 B1 | 1/2001 | Visotsky et al. | |
| 6,990,153 B1 * | 1/2006 | Farhang-Boroujeni et al. | 375/260 |

(Continued)

FOREIGN PATENT DOCUMENTS

EP    1 168 659 A1 *    1/2002

(Continued)

OTHER PUBLICATIONS http://www.ist-imetra.org/metra/papers/METRA_Final_Report.pdf.*

(Continued)

*Primary Examiner*—Mohammad H Ghayour
*Assistant Examiner*—Leila Malek
(74) *Attorney, Agent, or Firm*—Steven A. Shaw; W. James Brady; Frederick J. Telecky, Jr.

(57) ABSTRACT

The equalizer circuit (200) equalizes the channel prior to despreading thereby restoring the orthogonality of signals that typically exists in the forward link of CDMA systems and thus suppressing interference and improving the performance. The equalization method is based on the well-established normalized least-mean-squares (NLMS) algorithm. The tracking ability and the strength of the training signal of the NLMS are enhanced in the invention by using data feedback, in addition to the common pilot, to form the training signal. Based on initial data decisions, the transmitted signal can be reconstructed and included in the training signal. In cases where the transmitted signal for the receiver employs several codes as in a multicode transmission environment, the quality of the training signal can be significantly improved. This in turn results in considerable performance improvements to the extent that the resulting performance may be superior to that of other equalization techniques of similar or larger complexity.

18 Claims, 3 Drawing Sheets

U.S. PATENT DOCUMENTS

2001/0036223 A1* 11/2001 Webster et al. ............... 375/152
2003/0095529 A1* 5/2003 Petre et al. .................. 370/342
2003/0189992 A1* 10/2003 Nefedov ..................... 375/340

FOREIGN PATENT DOCUMENTS

| WO | WO 00/54427 A1 | 9/2000 |
| WO | WO 00/60762 | 12/2000 |
| WO | WO 02/09305 A2 | 1/2002 |

OTHER PUBLICATIONS

Heikkila, Markku J., "A Novel Blind Adaptive Algorithm for Channel Equalization in WCDMA Downlink," IEEE 2001, 0-7803-7244-Jan. 2001, pp. A-41-A-45.

"Adaptive Filter Theory", Simon Haykin, Prentice Hall, 1996, pp. 432-437, XP002251177.

* cited by examiner

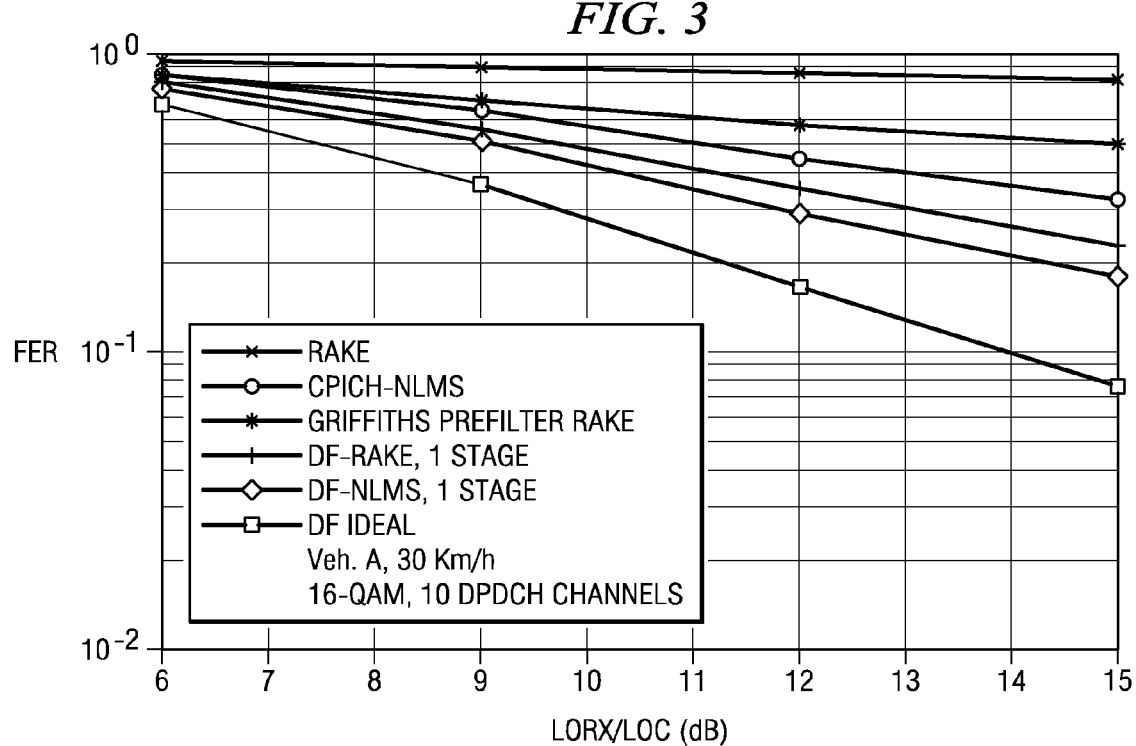
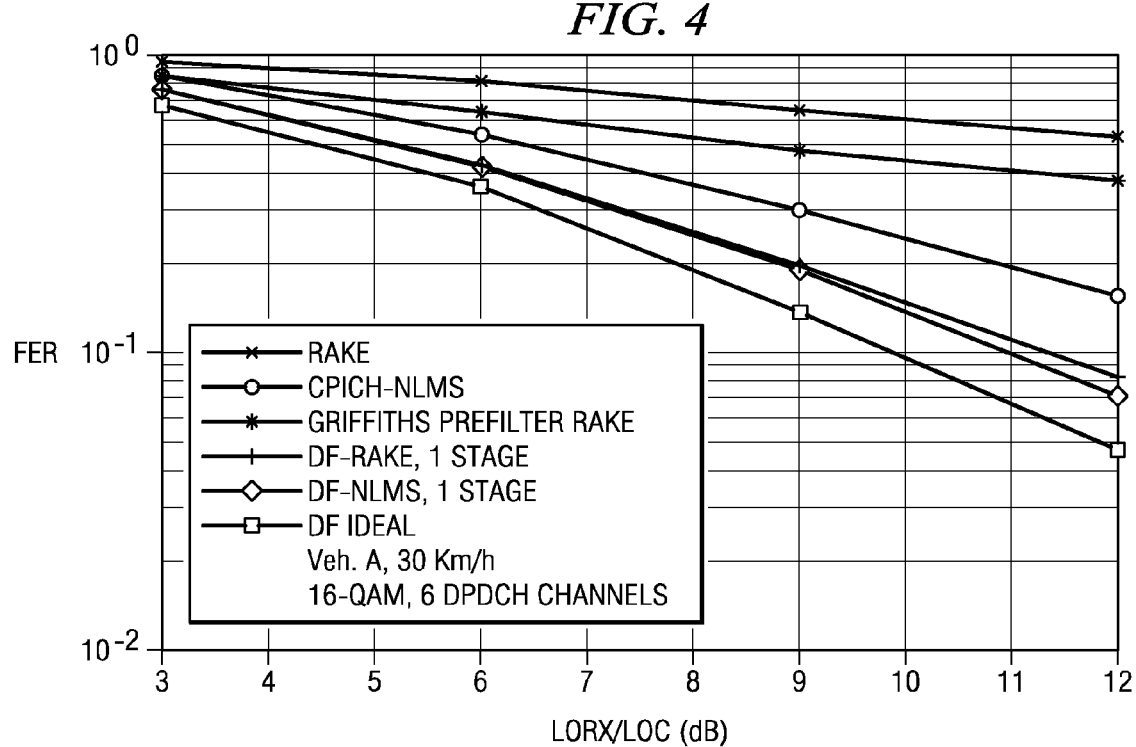

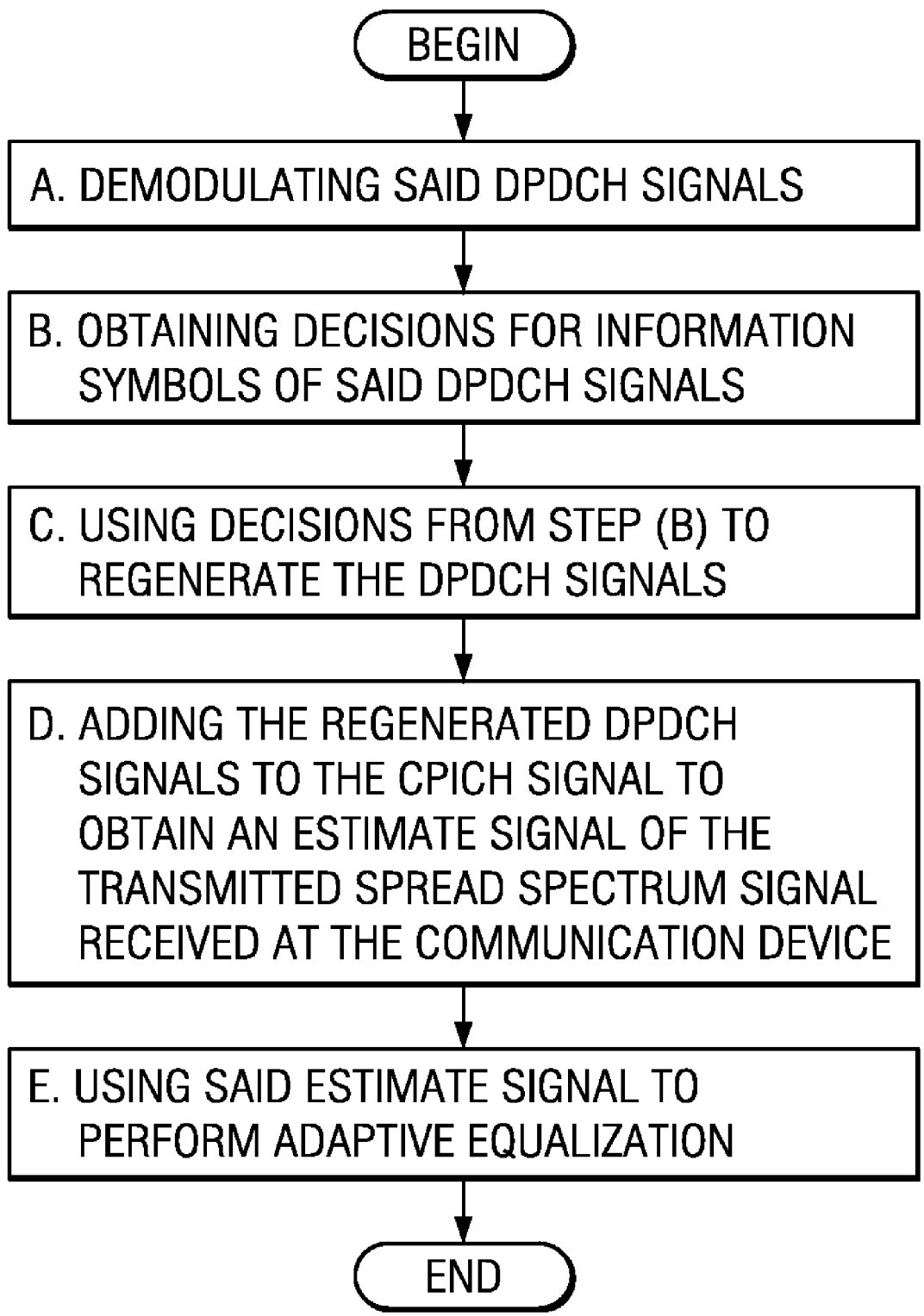

METHOD AND APPARATUS FOR ADAPTIVE CHANNEL EQUALIZATION USING DECISION FEEDBACK

CROSS REFERENCE TO RELATED APPLICATION

This application is based on a U.S. provisional application Ser. No. 60/387,667, filed on Jun. 11, 2002, which is fully incorporated herein by reference.

TECHNICAL FIELD

This invention relates in general to communication systems, and more particularly to a method and apparatus for performing adaptive channel equalization in spread spectrum communication systems using decision feedback.

BACKGROUND

Code Division Multiple Access (CDMA) has been extensively used in such areas as cellular and satellite communications. CDMA signals increase the spectrum required for the transmission of a particular data rate, by modulating each information symbol with a spread spectrum code having a rate larger than the data rate. In CDMA systems, the same spreading code is used for each information symbol. Typically, the spreading code is comprised of several tens or a few hundred elements, called chips. To decrease the correlation among spreading codes assigned to different system users, and thereby reduce the interference among the different users, the data stream after having been spread is typically scrambled with a pseudonoise (PN) code that is generated serially and cyclically and has a larger period than the spreading code. Examples of such CDMA signal spreading schemes are the schemes used by the IS-95/CDMA2000 and 3GPP (Third Generation Partnership Project) communication standards.

In the forward link of CDMA cellular communication systems, i.e. the communication link from base stations to mobile terminals (also referred to as user equipment (UE) or devices); the wireless channel may introduce multipath propagation. Even if the signals transmitted by the base station are spread using orthogonal codes (e.g., Walsh codes), the multipath propagation may destroy the orthogonality and produce multiple-access interference (MAI).

Typically, the forward link also includes a common pilot channel (CPICH) that carries known data and can be decoded by all mobiles. The CPICH is intended to provide channel information in order to enable the mobile receiver to identify received signal paths, estimate the channel, and perform tracking functions such as time and frequency tracking. Examples of CDMA communication system including a CPICH are encountered in 3GPP Release 1999 and Release 5 and in CDMA-2000 and 1xEVDV.

If the forward link does not employ transmit diversity, then an identical channel is experienced by the desired signal and the remaining same-cell interfering signals. For systems employing orthogonal spreading codes, such as the 3GPP Release 1999, 3GPP Release 5, and CDMA 2000, 1xEVDV standard compliant systems, chip equalization can restore orthogonality even in the presence of a scrambling code with a period much longer than the one for the orthogonal code (long scrambling code).

Several channel equalization methods have been proposed in the literature, including a least-mean-squares (LMS) algorithm approach [1] (Visotsky, et al, U.S. Pat. No. 6,175,588, Jan. 16, 2001), a Prefilter Rake receiver approach [2] (Heikkilae and Komulainen, WO0054427, Sep. 14, 2000), a Griffiths equalizer approach [3] (Heikkila, "A Novel Blind Adaptive Algorithm for Channel Equalization in WCDMA Downlink", pages A-41-A-45, Personal, Indoor and Mobile Radio Communications (PIMRC) 2001), and the conventional least-minimum-mean-squared-error (LMMSE) algorithm. All aforementioned equalizers, with the exception of LMMSE, are adaptive. The Prefilter Rake and Griffiths equalizers use an adaptation method that is similar in structure with that of the LMS. The advantage of such LMS-type algorithms is that the associated complexity is linear with the equalizer length.

The attractive feature of the CPICH-based LMS equalizer in [1] is its robustness to realistic imperfections. Channel estimation is not required and, since the CPICH-based LMS uses a single training signal, the actual multi-path profile is not relevant to the operation of the equalizer. The drawback of the CPICH-based LMS is its slow convergence in fast fading channel situations and its poor performance in the case of a weak training signal situation. Typically, the CPICH contains only about 10% of the total transmitted power and consequently the CPICH-based LMS equalizer in [1] uses only a small portion of the transmitted power. The result may be slow and inefficient adaptation, particularly in difficult channel conditions such as those encountered in rich multipath environments with high mobile speeds. As a consequence, the CPICH-based LMS may significantly under perform other linear complexity equalizers and it may not always offer better performance than the conventional Rake receiver that attempts no interference suppression.

The Prefilter Rake and Griffiths equalizers need channel estimation and are sensitive to time errors, relative path separation and unrecovered multipath power. These equalizers need to identify all existing paths and place a Rake finger at their time arrival instance (Prefilter Rake) or use the estimated channel response to adaptively invert the channel effect (Griffiths). Time errors affect the performance because of imperfect equalization. Path separation affects the performance in a similar fashion as time errors since a Rake finger needs to be placed at the correct time arrival of each path. Because paths arrive at arbitrary time instants, the time resolution needs to be at sub-chip level. Since the equalizer needs to span the entire delay spread of the channel in order to equalize all existing paths, the requirement for time resolution finer than 1 chip implies that the equalizer length has to be at least twice as long as the length of an equalizer requiring chip-spaced signal samples. A consequence of the previous requirement is that the convergence and adaptation of the equalizers will be slower as a result of the longer length and sub-chip signal samples. This leads to performance degradation. Another consequence is the associated increase in complexity due to the increased equalizer length. Finally, if there are paths that cannot be identified by the equalizer, either because they are too close (less than 1 chip apart) to an existing stronger path or because they are too weak to be identified, they will not be equalized and constitute interference. This can be especially harmful to interference sensitive modulations such as QAM-type and M-PSK-type (for M larger than 4) modulations. None of the previous shortcomings of Prefilter Rake and Griffiths equalizers is an issue for adaptive equalizers using a training signal for adaptation, such as the CPICH-based LMS equalizer in [1] or the LMS equalizer with decision feedback disclosed in this invention.

The LMMSE technique has the potential to provide the best performance at the expense of very high computational complexity. The channel estimate for each multipath is needed and the inversion of the associated channel response covariance matrix needs to be typically performed at the rate of channel estimation updates. However, this matrix may not always be invertible, particularly in independently fading multipath channels. A consequence of this effect is that the channel response covariance matrix needs to span a much larger duration than the one defined by the separation in samples between the first and last arriving paths as they are identified at the receiver. Since the multipath delay spread may be in the order of tens of chip periods, the channel response covariance matrix dimension may well exceed 100 in order to ensure a large enough probability for its invertibility. The larger the matrix dimension, the larger the probability that the matrix will be invertible at all time instances. Moreover, the LMMSE suffers from the same drawbacks previously mentioned for the Prefilter Rake and Griffiths equalizers. The complexity and sensitivity of the LMMSE to realistic imperfections severely diminish its usefulness as a channel equalizer for spread spectrum signals.

A general structure for a prior art chip equalizer is shown in FIG. 1. The received signal 102 is passed through the LMS equalizer 104 to produce the equalizer output 106. Using the spreading (Walsh) and scrambling (PN) codes 108, the CPICH signal 110 is generated and subtracted from the equalizer output to generate the error signal 112 which is then used to train the equalizer. The equalizer output 106 is also passed through despreader 114 to produce the decision statistic output 116.

The objective in developing channel equalizers for the forward link of CDMA systems naturally concentrates on improving the performance and tracking ability of the CPICH-based LMS technique and on approaching the performance theoretically achievable using the LMMSE. Moreover, robustness to realistic imperfections is necessary in order to avoid the limitations of the Prefilter Rake and Griffiths equalizers. Given the above shortcomings of present art equalizers, a need exists in the art for a method and apparatus that can restore orthogonality and suppress interference in the forward link of a CDMA communication system while having low complexity, achieving better performance than the conventional Rake receiver, and offering robust performance under realistic setups and imperfections of the communications link.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 3 shows a chart comparing Frame Error Rate (FER) as a function of geometry for 10 DPDCH for different equalizers.

FIG. 4 shows a chart comparing Frame Error Rate (FER) as a function of geometry for 6 DPDCH for different equalizers.

FIG. 5 shows a flowchart a method for performing channel equalization in accordance with an embodiment of invention.

DETAILED DESCRIPTION OF THE PREFERRED EMBODIMENT

Figure 1:
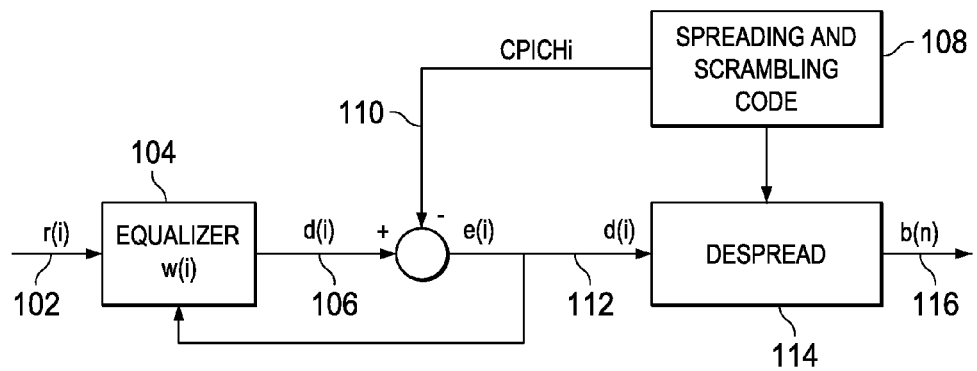
FIG. 1 shows a prior art block diagram of a CDMA receiver section including a CPICH-based LMS equalizer.

While the specification concludes with claims defining the features of the invention that are regarded as novel, it is believed that the invention will be better understood from a consideration of the following description in conjunction with the drawing figures, in which like reference numerals are carried forward.

The present invention presents a method and apparatus that restores orthogonality and suppresses interference, by improving the performance of the conventional CPICH-based normalized least-mean-squares (NLMS) algorithm by reconstructing the received signal prior to despreading based on tentative decisions for the received signal. It also describes a device implementation for the disclosed equalization method.

In 3GPP Release 5 and 1xEVDV systems, the mobile receiver must have the capability to despread all code channels of a particular spreading factor. 3GPP Release 5 uses codes of spreading factor 16 and there may be a maximum of 15 dedicated physical data channels (DPDCH) send to the mobile in addition to the CPICH. Similarly, 1xEVDV uses a spreading factor of 32 and there may be a maximum of 31 DPDCH send to the mobile in addition to the CPICH. This required capability of the mobile receiver to despread and demodulate multiple DPDCH enables it to potentially use these channels to train the adaptive equalizer in addition to using just the CPICH as in [1]. In that manner the mobile receiver uses all or a much larger portion of the total transmitted signal power for training thereby enabling the equalizer to achieve must faster convergence and considerably better performance than it would be possible to achieve by using only the CPICH for training.

The received multiple DPDCH can first be demodulated using a conventional Rake receiver or an equalizer of prior art, such as the CPICH-based NLMS. Subsequently, once estimates for the information data of the multiple DPDCH become available after demodulation, those channels can be re-spread and used in conjunction with the CPICH to perform adaptive NLMS equalization and provide new data estimates after a new despreading and demodulation process. This process may be repeated a number of times as new and more reliable data estimates for the DPDCH become available. Typically, the error rate of initial decisions for the DPDCH is about 10% or smaller, thereby enabling the use of the estimated re-spread DPDCH for the equalizer training since the correctly regenerated signal portion is much larger than the incorrectly regenerated one.

Using the 3GPP Release 5 system as an example, although Release 1999 voice signals having spreading factors larger than 16 may coexist with Release 5 signals having spreading factor 16, these voice signals can be treated as Release 5 signals for the purposes of the disclosed equalization method. This is because the codes used by the voice signals have as a root code in the code tree a code of spreading factor 16 that is not used by Release 5 signals. The mobile receiver is aware of codes of spreading factor 16 not used by itself and can determine the ones being root codes to codes of an equal or larger spreading factor carrying voice signals or possibly other Release 5 signals. The mobile can simply do this determination by despreading with the codes of spreading factor 16 not used by itself and comparing the corresponding signal energy with the noise floor. If an unused by the mobile code of spreading factor 16 is a root code for voice signals, or a code used by other Release 5 signals, the result will correspond to the sum of the contributions from the signals having that particular code as their root code. Making a soft decision for the composite of the individual voice signals contributions allows the use of the corresponding composite signal power to be included in the signal used to train the equalizer. This does not increase the complexity since the mobile should anyway have the capability to process all 16 codes of spreading factor 16 (CPICH and 15 Release 5 DPDCH).

Because the soft decision made for the contribution from voice signals as previously described is not as reliable as the decision made for the DPDCH signals intended for the mobile receiver, the corresponding regenerated composite voice signal may be scaled with a value smaller than 1.0 and smaller than the value used to scale the regenerated composite signal of the Release 5 DPDCH signals. In the total regenerated signal that provides an estimate of the total transmitted signal, the CPICH is not scaled since the corresponding information data is always correct and known by the mobile. In other words, for the 3GPP Release 5 system, the total regenerated signal may be viewed as the sum of the CPICH component scaled by 1.0, the Release 5 components scaled by a value smaller than or equal to 1.0 and the Release 1999 voice signal components, or other Release 5 signals destined for another mobile, scaled by values smaller than the one used for the Release 5 signals destined to the mobile of interest. Notice that even if the Release 1999 voice signals are ignored from the total regenerated signal (for example by not despreading and demodulating the information of code channels not destined for the particular mobile), the regenerated signal will contain the Release 5 DPDCH signals in addition to the CPICH and will therefore correspond to a much larger portion of the total transmitted power than the CPICH alone.

The following description of the preferred embodiment applies to the mobile receiver (or user equipment UE) of a CDMA communication system. This description considers the forward link of a CDMA system employing the transmission of a Common Pilot Channel (CPICH) and of multiple dedicated physical data channels (DPDCH) to the same UE that are distinguished by different orthogonal codes. Examples of such CDMA systems include 3GPP Release 5 and 1xEVDV compliant systems.

In the exemplary embodiment initial DPDCH and voice signals decisions are made using an NLMS adaptive chip equalizer employing the CPICH as its training signal [1]. Alternatively, a conventional Rake receiver, the equalizers in [2] or [3], or any other receiver may be used to provide the initial DPDCH and voice signals decisions. The objective is to provide initial decisions of enough reliability for the regenerated signal to be an accurate representation of the transmitted signal while maintaining a receiver of low complexity. Those initial decisions may not have the reliability needed for correct packet reception but are typically accurate enough to allow the regeneration of a signal useful for training the NLMS-based adaptive equalizer of the disclosed invention. The new decisions obtained from the adaptive equalizer using both the re-spread DPDCH signals and the CPICH for training will be much more likely to lead to correct packet reception. In that manner, having packet retransmissions or using a modulation and coding scheme of lower spectral efficiency, as specified in 3GPP Release 5, for the given channel conditions can be avoided.

Figure 2:
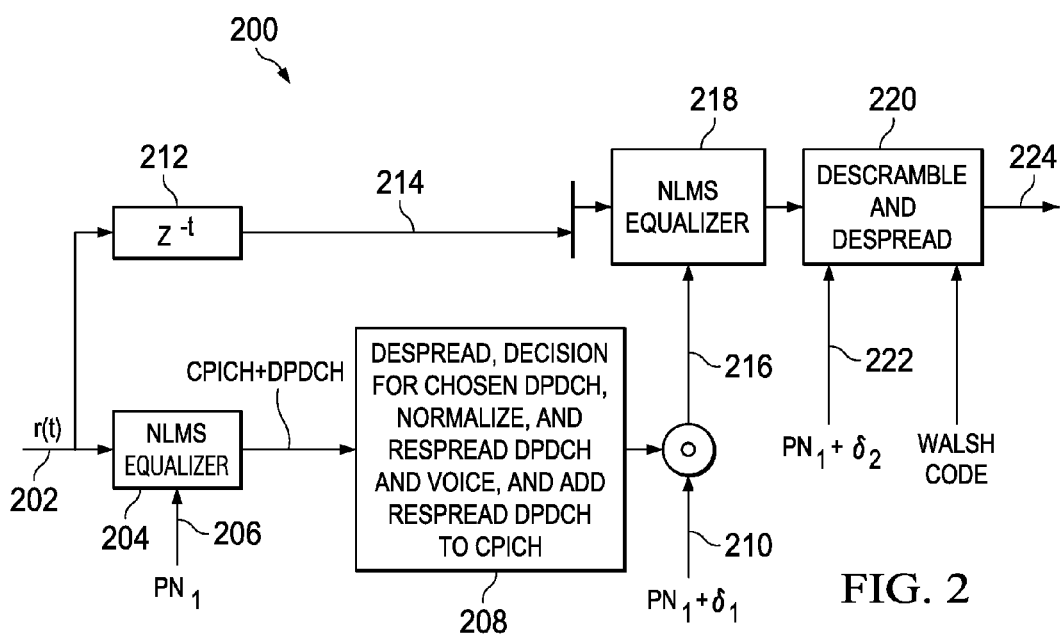
FIG. 2 shows a block diagram of a decision feedback based LMS equalizer in accordance with the invention.

The structure of the NLMS-based equalizer with decision feedback section 200 in accordance with the preferred embodiment is shown in FIG. 2. The received signal 202 is first passed through the CPICH-based NLMS equalizer 204 described in FIG. 1. Since the CPICH information symbols are all ones and its Walsh code is also all ones (numeric), only the scrambling code PN 206 needs to be provided to the equalizer 204 to generate the CPICH for training. Subsequently, in 208, the output of the equalizer 204 is despread, the decisions for the chosen DPDCH and voice signals are made, the DPDCH and voice signals are respread with the corresponding Walsh codes added to the CPICH signal after normalizing with the estimated DPDCH/CPICH and voice signal/CPICH power ratios and scaling with appropriate weight values reflecting the decision reliability for the CPICH, the DPDCH, and voice signals.

The output is then scrambled by the PN scrambling code 210 having a different offset and being a delayed version of the PN scrambling code 206. The received signal is delayed 212 by a number of samples corresponding to the processing delay required by equalizer 204 and processing block 208. The delayed received signal 214 and the scrambled and spread regenerated signal 216 are then passed through a second NLMS equalizer 218. The output of the second NLMS equalizer is provided to a second despreader and descrambler 220 using another delayed version of the PN code 222 to perform descrambling. Finally, the new output 224 provides the new decision statistic. This process may be repeated if the performance gains justify the additional complexity attributed to repeating the process. It has been found that most performance benefits are obtained after one or two iterations of the above process.

The parameters and operation of the NLMS equalizer circuit 200 for a given illustrative example are given as follows:

NLMS Parameters
μ—adaptation constant
a—positive constant (default 0)
D—delay for the desired signal Data
$\bar{r}(n)$—received signal in the filter at time n
w(n)—filter tap coefficients at time n
$x(n)=w^H(n)\bar{r}(n)$—equalizer output at time n
d(n)—desired response, (CPICH chip at time n for $1^{st}$ NLMS 204 or composite respread signal for $2^{nd}$ NLMS block 216)

Initialization
w(0)=0

Computation
output signal $x(n)=w^H(n)\bar{r}(n)$
error signal e(n)=d(n−D)−x(n)

$$w(n+1) = w(n) + \frac{\mu}{a + \|\bar{r}(n)\|^2} \bar{r}(n)e*(n)$$

As described above in relation to FIG. 2, the tracking ability and the strength of the training signal of the NLMS algorithm are enhanced in the present invention by using data feedback to reconstruct the data signals (DPDCH and voice signals) and form a composite CPICH and data signal to train the adaptive equalizer.

Two examples for the performance of prior art receivers (conventional Rake and equalizers) and the performance of the equalizer of the disclosed invention are given in FIG. 3 and FIG. 4. The frame error rate (FER) is presented for the 3GPP turbo code of rate ½ as a function of the ratio of intracell to intercell received power (also referred to in the literature as geometry). The communication system setup is as of 3GPP Release 5. The channel model used for the tests was the modified ITU Vehicular A model and the mobile speed was 30 Km/h. The data modulation used was 16-QAM. There is fractional un-recovered power of 10% of the total transmitted power inside the equalizer span. The FER performance is given in FIGS. 3 and 4 for 10 and 6 DPDCH channels dedicated to the mobile receiver of interest.

As shown in FIG. 3 and FIG. 4, the performance of the disclosed equalizer with only one iteration of decision feedback, whether the initial decisions are made based with the conventional Rake receiver (DF-Rake) or with the CPICH-trained NLMS (DF-NLMS), is considerably better than those of the CPICH-based NLMS, Prefilter Rake, and Griffiths equalizers. All equalizers outperform the conventional Rake receiver whose performance is very sensitive to the presence of multipath interference for QAM-type modulations. Moreover, when the disclosed equalizer process is repeated a few times, or when the particular channel realization is good to schedule QAM transmissions with accurate demodulation, the performance will approach that of the disclosed equalizer with ideal (always correct) feedback (DF-ideal).

The present invention has been described with reference to a preferred embodiment. However, those skilled in the art having read this disclosure will recognize that changes and modifications may be made to the preferred embodiment without departing from the scope of the present invention. These and other changes or modifications are intended to be included within the scope of the present invention.

The invention claimed is:

1. In a communication device receiving a spread spectrum signal which includes a common pilot channel (CPICH) signal and a plurality of dedicated physical data channel (DPDCH) signals, a method for performing channel equalization at a receiver, comprising:
   demodulating said plurality of DPDCH signals included in said spread spectrum signal;
   obtaining decisions for information symbols of said DPDCH signals included in said spread spectrum signal;
   re-spreading with a spreading code said decisions for information symbols of said DPDCH signals to regenerate said plurality of DPDCH signals;
   adding said regenerated plurality of DPDCH signals to the CPICH signal to produce a summed signal;
   re-scrambling said summed signal with a PN code to obtain an estimate signal of the transmitted spread spectrum signal received at the communication device;
   using said estimate signal to perform adaptive equalization;
   demodulating a voice signal included in said spread spectrum signal;
   obtaining decisions for information symbols of said voice signal included in said spread spectrum signal;
   re-spreading with a spreading code said decisions for information symbols of said voice signal to regenerate said voice signal;
   scaling said regenerated voice signal by a smaller value than a value used to scale a regenerated DPDCH signal; and
   adding said scaled voice signal, said regenerated plurality of DPDCH signals and said CPICH signal to produce said summed signal.

2. A method as defined in claim 1, wherein said demodulating includes performing descrambling, despreading, and Rake processing said plurality of DPDCH signals included in said spread spectrum signal.

3. A method as defined in claim 1, wherein said demodulating includes performing adaptive equalization, descrambling, and despreading said plurality of DPDCH signals included in said spread spectrum signal.

4. A method as defined in claim 3, wherein adaptive equalization includes performing CPICH-based normalized least-mean-squares (NLMS).

5. A method as defined in claim 3, wherein adaptive equalization includes performing Prefilter-Rake equalization.

6. A method as defined in claim 3, wherein adaptive equalization includes performing normalized least-mean-squares (NLMS) adaptive equalization using an estimate of the transmitted spread spectrum signal.

7. A method as defined in claim 1, wherein obtaining decisions for information symbols includes soft, hard, or soft-clipped decisions.

8. A method as defined in claim 1, wherein each of said regenerated plurality of DPDCH signals is scaled by a value between 0.0 and 1.0.

9. A method as defined in claim 1, wherein each of said regenerated plurality of DPDCH signals is scaled by the power ratio of said DPDCH signals over said CPICH signal.

10. A method as defined in claim 1, wherein said adaptive equalization uses a normalized least-mean-squares (LMS) chip-based equalizer.

11. A method as defined in claim 1, further comprising repeating the method at least once.

12. A communication device for receiving a spread spectrum signal that includes a common pilot channel (CPICH) signal and a plurality of dedicated physical data channel (DPDCH) signals, the communication device comprising:
   an input port for receiving the spread spectrum signal;
   a demodulation section coupled to the input port for demodulating the plurality of DPDCH signals, wherein said demodulation section demodulates a voice signal included in said received spread spectrum signal;
   a decision section coupled to the demodulation section for obtaining decisions for information symbols of the plurality of DPDCH signals, wherein said decision section obtains decisions for information symbols of said voice signal;
   a regeneration section that re-spreads with a spreading code the decisions for information symbols of the plurality of DPDCH signals made by the decision section to regenerate the plurality of DPDCH signals and adds the regenerated plurality of DPDCH signals to the CPICH signal to produce a summed signal, wherein said regeneration section re-spreads with a spreading code the decisions for information symbols of said voice signal made by said decision section to regenerate said voice signal, scales said voice signal by a smaller value than a value used to scale a regenerated DPDCH signal, and adds said scaled voice signal, said regenerated plurality of DPDCH signals, and said CPICH signal to form said summed signal;
   a scrambler that re-scrambles with a PN code said summed signal to obtain an estimate signal of the spread spectrum signal that was transmitted to the communication device; and
   a normalized least-mean-squares (NLMS) equalizer coupled to the scrambler for performing adaptive equalization.

13. A communication device as defined in claim 12, wherein the demodulation section includes a normalized least-mean-squares (NLMS) equalizer.

14. A communication device as defined in claim 12, wherein the demodulation section performs descrambling, despreading and Rake processing of the DPDCH signals.

15. A communication device as defined in claim 12, wherein the demodulation section performs adaptive equalization, descrambling and despreading of the regenerated plurality of DPDCH signals.

16. A communication device as defined in claim 12, wherein the regeneration section scales each of the regenerated plurality of DPDCH signals by a value between 0.0 and 1.0.

17. A communication device as defined in claim 12, wherein the regeneration section scales each of the regenerated DPDCH signals by the power ratio of the DPDCH signals over the CPICH signal.

18. A communication device as defined in claim 12, wherein said plurality of DPDCH signals are spread with codes of at least one spreading factor.

* * * * *